United States Patent
Breault et al.

(10) Patent No.: US 9,685,666 B2
(45) Date of Patent: Jun. 20, 2017

(54) MOLDED COOLANT PLATE ASSEMBLY WITH INTEGRAL REACTANT FLOW FIELDS AND THERMAL DAM

(75) Inventors: Richard D. Breault, North Kingstown, RI (US); Eric A. Livaich, South Windsor, CT (US); Kishore K. Tenneti, Manchester, CT (US); Sridhar V. Kanuri, Milford, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 405 days.

(21) Appl. No.: 14/352,730

(22) PCT Filed: Oct. 25, 2011

(86) PCT No.: PCT/US2011/057587
§ 371 (c)(1),
(2), (4) Date: Apr. 18, 2014

(87) PCT Pub. No.: WO2013/062520
PCT Pub. Date: May 2, 2013

(65) Prior Publication Data
US 2014/0255811 A1    Sep. 11, 2014

(51) Int. Cl.
*H01M 8/04*         (2016.01)
*H01M 8/04007*      (2016.01)
(Continued)

(52) U.S. Cl.
CPC ..... *H01M 8/04067* (2013.01); *H01M 8/0213* (2013.01); *H01M 8/0221* (2013.01);
(Continued)

(58) Field of Classification Search
None
See application file for complete search history.

(56) References Cited

U.S. PATENT DOCUMENTS

| 4,728,585 A | 3/1988 | Briggs |
| 4,851,304 A | 7/1989 | Miwa et al. |

(Continued)

FOREIGN PATENT DOCUMENTS

| JP | 09259899 | 10/1997 |
| JP | 2000012049 | 1/2000 |

(Continued)

OTHER PUBLICATIONS

JP 2003-077485—Fuel cell searator and its manufacturing method (AIPN translation).*

(Continued)

*Primary Examiner* — Sarah A Slifka
*Assistant Examiner* — Haroon S Sheikh
(74) *Attorney, Agent, or Firm* — Carlson, Gaskey & Olds, P.C.

(57) ABSTRACT

An end-cooler assembly for a fuel cell includes a cooler having a coolant tube array. A composite material includes flake graphite and hydrophobic polymer. The composite material surrounds the coolant tube array and provides a first side. A flow field is formed in the first side. A thermal dam is embedded in and is entirely surrounded by the composite material. The thermal dam is arranged between the coolant tube array and the flow field. The coolant tube array, composite material, flow field and thermal dam comprise a unitary, monolithic structure bound together by the composite material.

14 Claims, 3 Drawing Sheets

(51) Int. Cl.
*H01M 8/0213* (2016.01)
*H01M 8/0221* (2016.01)
*H01M 8/0223* (2016.01)
*H01M 8/0267* (2016.01)
*H01M 8/086* (2016.01)

(52) U.S. Cl.
CPC ....... *H01M 8/0223* (2013.01); *H01M 8/0267* (2013.01); *H01M 8/04074* (2013.01); *H01M 8/086* (2013.01)

(56) References Cited

U.S. PATENT DOCUMENTS

| | | | |
|---|---|---|---|
| 4,929,517 A | 5/1990 | Lumoa et al. | |
| 5,558,955 A | 9/1996 | Breault et al. | |
| 6,050,331 A * | 4/2000 | Breault | F28F 21/02 165/168 |
| 6,248,467 B1 * | 6/2001 | Wilson | C25B 9/04 429/210 |
| 2011/0177419 A1 | 7/2011 | Luoma | |

FOREIGN PATENT DOCUMENTS

| | | |
|---|---|---|
| JP | 2003077485 | 3/2003 |
| JP | 2003077485 A * | 3/2003 |

OTHER PUBLICATIONS

International Search Report and Written Opinion for PCT/2011/057587 Completed Apr. 25, 2012.

* cited by examiner

MOLDED COOLANT PLATE ASSEMBLY WITH INTEGRAL REACTANT FLOW FIELDS AND THERMAL DAM

BACKGROUND

This disclosure relates to a coolant plate assembly having integral reactant flow fields, an integral cooler and an integral thermal dam used as an end-cooler assembly in a cell stack assembly.

One type of fuel cell is a phosphoric acid fuel cell (PAFC). One particular configuration of PAFC includes a cell stack assembly (CSA) having 376 cells. Coolers are arranged between every eight cells. Additionally, a cooler is provided at either end of the CSA between the end cells and their adjoining pressure plates. Thus, there are forty-eight total coolers used in this particular configuration.

A coolant fluid, such as water, is provided to the coolers as liquid. The coolant fluid exits the coolers as a two-phase liquid-steam mixture. It is desirable to design a coolant distribution system to produce nearly equal flow to every cooler. This design task is difficult to achieve because the pressure drop across the coolers is a function of coolant flow rate and the quantity of steam produced. The coolers on the interior of the CSA receive waste heat from the cells arranged on either of its sides. The end coolers only receive waste heat from the cells on one of its sides, since the pressure plate is located on its other side. Thus, less steam is produced in the end coolers compared to the interior coolers, which results in increased coolant flow in the end coolers. Accordingly, the end coolers will have a lower temperature, which can cause the adjoining cells to operate at a less than desired temperature. Undesirably low temperatures reduce the cells' tolerance to the carbon monoxide typically present in reformed natural gas fuel, which reduces cell efficiency.

Thermal dams have been used in PAFC CSA between the end coolers and their adjacent cell to increase the temperature of the adjacent cells. One type of thermal dam is formed by laminating a 5.0 mil (0.127 mm) fluorinated ethylene propylene (FEP) polymer film between a pair of 19.7 mils (0.5 mm) carbonized substrates to provide a laminate. The laminate is secured between a pair of 90 mils (2.29 mm) preforms constructed from 89% flake graphite and 11% FEP preforms under a pressure of 200 psi (1400 kPa) at 343° C. (650° F.) and cooled under compression to below 200° C. (392° F.). The thermal dam is machined to a final thickness of 170 mils (4.3 mm) after lamination.

A carbonized substrate is a substrate made by a procedure similar to that outlined in U.S. Pat. No. 4,851,304 issued to Toray except that the high temperature graphitization step is eliminated. The thermal conductivity of one type of substrate carbonized at about 1550° F. or 845° C. is about 0.1 Btu/hr-ft-° F. (0.17 W/m-° K), which is about $\frac{1}{7}$ that of a graphitized substrate. The total temperature increase across the thermal dam is adjusted by varying the carbonization temperature of the carbonized substrate or by varying the thickness of the carbonized substrate. One type of PAFC thermal dam uses two 20 mils (0.50 mm) thick carbonized substrates. This results in a temperature increase of about 30° F. (17° C.) across the thermal dam at rated power which raises the temperature of the cell adjacent to the cooler by this amount.

A typical end-cell assembly is quite complicated. The perimeter of each of the thermal dam, the cooler and the pressure plate is wrapped in polytetrafluoroethylene (PTFE) tape to prevent acid absorption. The perimeters of the end-cell assembly components are aligned with one another. The graphite-FEP flow field plate is bonded to a graphitized separator plate. The flow field plate bonded to a graphitized separator, a molded cooler assembly, the thermal dam and a pressure plate, which are separate, discrete components from one another. Manufacturing and assembling these components is time consuming and expensive. The graphitized separator plate is arranged between the thermal dam and the flow field plate. Interfaces between the components are painted with a fluoroelastomer to create a seal against acid and gas penetration.

Exemplary prior art system are disclosed in U.S. Pat. Nos. 4,728,585; 4,929,517; 5,558,955; and 6,050,331, which are incorporated by reference.

SUMMARY

An end-cooler plate assembly for a fuel cell includes a cooler having a coolant tube array. A composite material includes flake graphite and hydrophobic polymer. The composite material surrounds the coolant tube array and provides a first side. A reactant flow field is formed in the first side. A thermal dam is embedded in and is entirely surrounded by the composite material. The thermal dam is arranged between the coolant tube array and the flow field. The coolant tube array, composite material, flow field and thermal dam comprise a unitary, monolithic structure bound together by the composite material.

A method of manufacturing a coolant plate assembly includes the steps of depositing into a mold a first volume of a mixture of about 80-85% by weight flake graphite with the balance a hydrophobic polymer binder; loading into the mold a coolant tube array onto the first volume; depositing into the mold a powder of the mixture onto the coolant tube array; loading into the mold a thermal dam onto the powder; depositing into the mold a second volume of the mixture onto the thermal dam; compressing the contents of the mold above the melting point of the polymer; cooling to below the solidifying point of the polymer while compressed; and removing from the mold a unitary, monolithic structure comprising the mixture, the coolant tube array and the thermal dam.

BRIEF DESCRIPTION OF THE DRAWINGS

The disclosure can be further understood by reference to the following detailed description when considered in connection with the accompanying drawings wherein.

DETAILED DESCRIPTION

Figure 1:
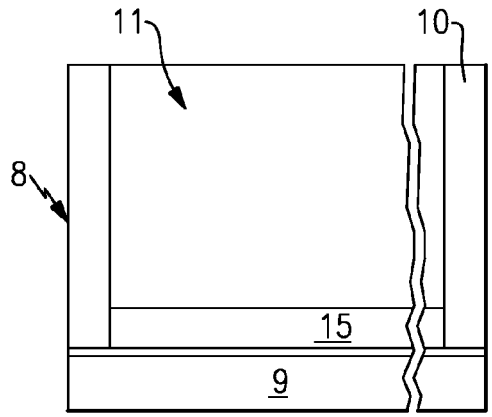
FIG. 1 is a simplified front sectional view, with sectioning lines omitted for clarity, of a mold having a preform loaded therein.

The co-pending US application, filed herewith by the assignee of the present application, entitled "Acid Resistant, Monolithic Fuel Cell Cooler Assembly," is incorporated by reference. Referring to FIG. 1, a mold 8 has a base 9, a pair of side rails 10, and front and back portions, only the back portion 11 being shown. In FIG. 1, a first volume has been filled by a preform 15 which has been added to the mold. The preform comprises a mixture of between about 80 wt. % and about 85 wt. % flake graphite, which may be thermally purified, natural graphite flakes, and the balance is a hydrophobic thermoplastic polymer binder. This mixture creates a lower acid absorption than 89 wt. % flake graphite mixtures, for example. The binder may be fluorinated ethylene-propylene, which is available from DuPont under the tradename FEP TEFLON®, or perfluoroalkoxy, which is available from DuPont under the tradename PFA TEFLON®, or polytetrafluorethene (PTFE) available from DuPont, or mixtures thereof. For an exemplary cooler assembly in accordance herewith that is 508 mm (20.0 in)×508 mm (20.0 in) ×17 mm (0.67 in), the preform 15 is made by compacting approximately 3000 grams (6.6 lbs) of the flake graphite and polymer mixture at about 4000 psi (27,600 kPa).

Figure 2:
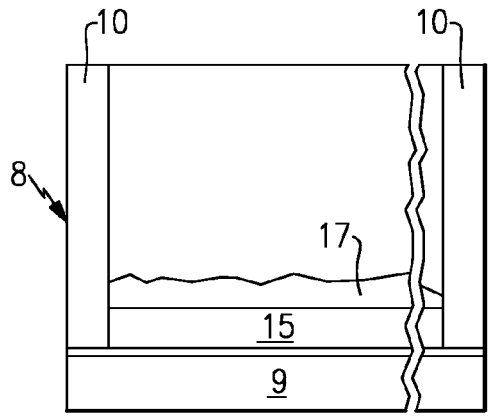
FIG. 2 is a view of the mold of FIG. 1 having a powdered mixture of flake graphite and polymer binder loaded on top of the preform.
Figure 3:
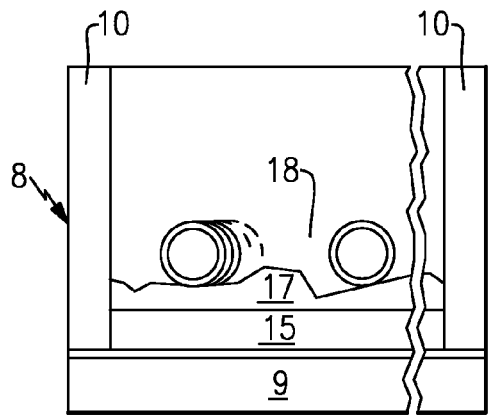
FIG. 3 is a view of the mold of FIG. 2 having a cooler tube array loaded on top of the powdered mixture.

Referring to FIG. 2, on top of the preform 15, a layer of powder 17 having a mixture of flake graphite and polymer binder of the aforementioned composition is spread above the preform 15. In FIG. 3, a cooler 18 including a cooler array tube is placed over the powder 17. In one example, the cooler array tube may have a serpentine configuration having on the order of fourteen segments. The tube may be made of a suitable material, such as stainless steel or other metal, which can withstand the operation of a fuel cell coolant system and the cooler fabrication process. In the exemplary coolant plate assembly, the coolant tube may have an outside diameter of about 6.4 mm (0.25 in).

Figure 4:
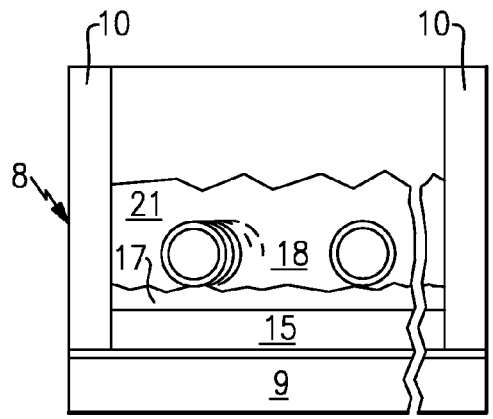
FIG. 4 is a view of the mold of FIG. 3 having a powdered mixture of flake graphite and polymer binder loaded around and above the coolant tube array.

In FIG. 4, a suitable volume of powder, comprising the aforementioned mixture of flake graphite and polymer binder, is spread between and above the cooler 18. For the size coolant plate assembly referred to hereinbefore, about 3800 grams (8.4 lbs) of powder may be used.

Figure 5B:
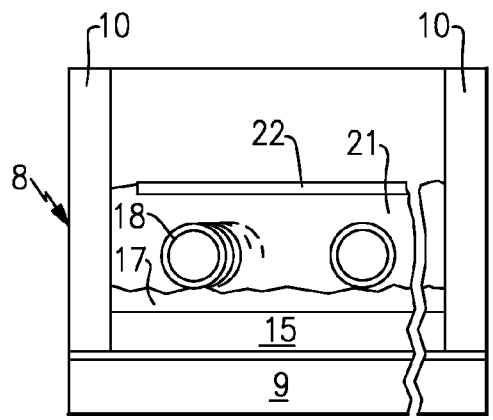
FIG. 5B is a view of the mold of FIG. 4 having the thermal dam preform loaded on top of the powdered mixture.
Figure 5A:
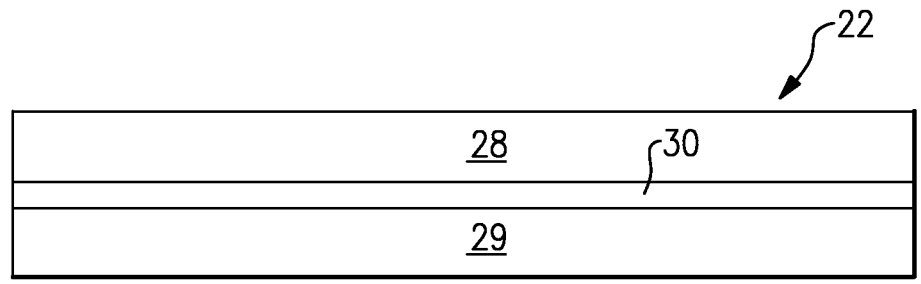
FIG. 5A is a schematic view of a thermal dam preform.

In one example, the thermal dam 22 is provided by having a FEP film 30 arranged between first and second carbonized substrates 28, 29, as shown in FIG. 5A. The components of the thermal dam 22 may be laminated prior to being deposited into the mold, or the components may be deposited into the mold unlaminated. In one example, the carbonized substrates 28, 29 have an electrical areal resistance of about 0.016 ohm-in$^2$ (0.1 ohm-cm$^2$) providing a voltage drop across the thermal dam of about 0.010 V at a current density of 93 A/ft$^2$ (0.1 A/cm$^2$). The thermal dam 22 includes a thermal conductivity of about 0.1 Btu/hr-ft-° F. (0.17 W/m-° K) and is about 40 mils (1.0 mm) thick.

The planform of the thermal dam 22 is smaller than the over-all planform of coolant plate assembly, best shown in FIGS. 5B-9. That is, the perimeter of the thermal dam 22 is arranged inboard from the perimeter of the cooler assembly 26 such that the thermal dam 22 is surrounded by the mixture of composite material.

The number of carbonized substrates, their thickness and their heat-treat temperature are selected to achieve the desired increase in cell temperature. In one example, two 0.50 mm thick carbonized substrates with a thermal conductivity of about 0.1 Btu/hr-ft-° F. (0.17 W/m-° K) are used. This results in a temperature increase of about 30° F. or about 17° C. across the thermal dam 22 at rated power of about 180 W/ft$^2$ (0.2 W/cm$^2$) which raises the temperature of the cell adjacent to the cooler by this amount.

The compressive strength of the carbonized substrates is greater than the 800 psi (5600 kPa) used to mold the coolant plate assembly 26. If further thermal dam strength is desired, the carbonized substrate may be impregnated with PTFE. In one example, the substrate is impregnated with PTFE by dipping the substrate into a commercial PTFE dispersion containing about 60% PTFE by weight and drying to evaporate the water. This will result in a PTFE pick-up of about 30-40 mg/cm$^2$ for a 0.5 mm thick substrate. The PTFE matrix will densify during the cooler molding process at 290° C.; but will not melt and will not extrude from the substrate. This densified PTFE matrix will provide reinforcement for the carbonized substrate when molded at 625-900 psi (4311-6300 kPa).

Figure 6:
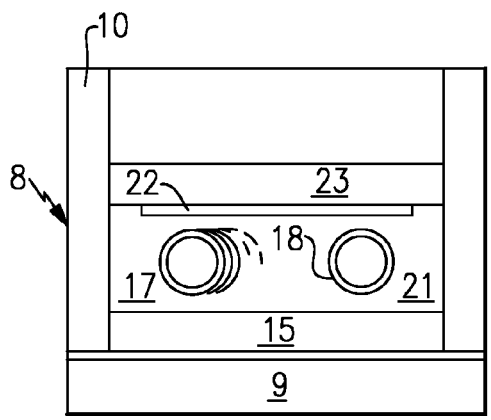
FIG. 6 is a view of the mold of FIG. 5B having a preform loaded on top of the thermal dam preform and the powdered mixture.

The carbonized substrate or substrates sandwiched around a FEP film are placed on top of the graphite powder above the cooler, as shown in FIG. 5B. In FIG. 6, a second volume is deposited in the form of a preform 23, identical to the preform 15, which is placed on top of the powder 21. More than two preforms may be used during manufacturing of the coolant plate assembly 26. Also, instead of compacted preforms, the aforementioned mixture may be used in powdered form at the bottom of the mold and in all the volume above the coolant tube. The coolant plate assembly 26 contains a uniform mixture composition across its thickness.

It is desirable for the preforms to be nearly the same thickness to ensure that the tube is centered near the middle of the coolant plate assembly. The thickness of the preforms 15, 23 and the amount of powder 17, 21 should be enough to ensure that there is sufficient graphite-FEP web 25, shown in FIG. 8, around the cooler 18 to provide a reliable barrier to acid penetration to prevent corrosion of the metallic tube. The web 25 is defined as the distance between the greatest depth of the reactant flow fields 31 and the uppermost surface of the thermal dam 22. The web thickness must be sufficient to ensure that acid does not penetrate to the cooler tube over the life of the fuel cell system. In the exemplary system referred to hereinbefore, the web should be not less than about 1.4 mm (0.06 in) for long-term reliability.

Figure 7:
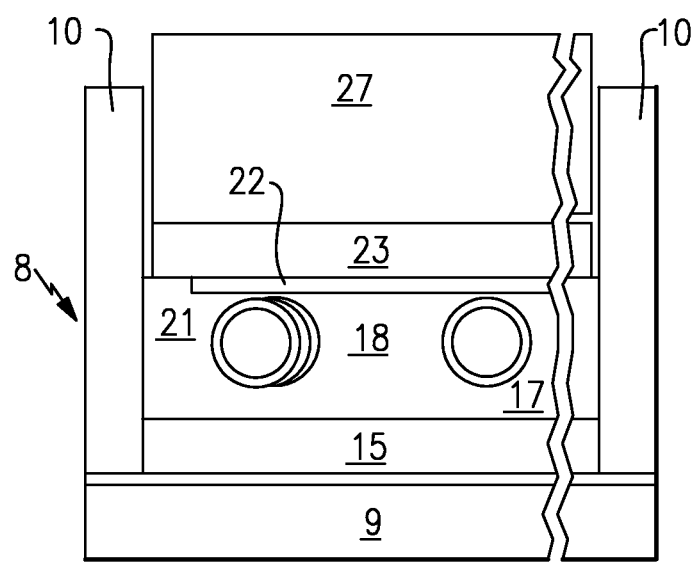
FIG. 7 is a view of the mold of FIG. 6 with a mold plunger arranged in the mold during molding of the composite coolant plate assembly.

In FIG. 7, the composite coolant plate assembly 26 is formed by having the mold plunger 27 apply about 625-900 psi (4311-6300 kPa) of pressure while the material in the mold is heated above the melting temperature of the polymer, about 550-650° F. (288-343° C.), for FEP TEFLON®. After a short period of time, for example, about 5 minutes, the contents of the mold are allowed to cool below the solidifying temperature of the thermoplastic polymer, such as about 400° F. (204° C.) for FEP TEFLON® while maintaining the pressure of about 625-900 psi (4311-6300 kPa). Then the mold is cooled further, the mold is disassembled, and the unitary, monolithic composite coolant plate assembly 26 is removed.

During the molding process, the preform density increases from about 1.8 g/mL (about 1.03 oz/in$^3$) to about 2.1 g/mL (about 1.2 oz/in$^3$). The melting of the hydrophobic polymer and its flowing over and around the graphite flakes, and its bonding with the flake graphite under pressure, causes the highly hydrophobic and non porous nature of the composite plate, which provides superior resistance to acid penetration.

Figure 8:
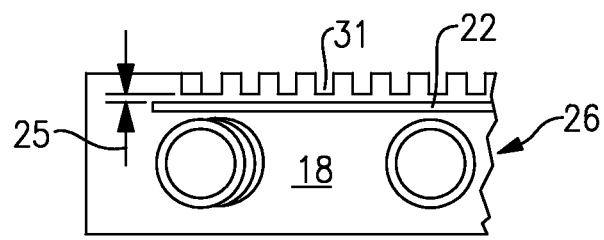
FIG. 8 is a partial front sectional view, with sectioning lines omitted for clarity, of a composite, monolithic coolant plate assembly, including cooler tubes, flow fields and a thermal dam according to this disclosure.

FIG. 8 illustrates a portion of the composite coolant plate assembly 26 after flow field channels 31 have been provided therein. In the case of air flow field channels, the channel depth may be about 0.7 mm (0.03 in). In the case of fuel channels, the channel depth may be about 1.0 mm (0.04 in). Both types of channels are about 1.6 mm (0.6 in) wide. The flow channels can be machined or molded into one side of the coolant plate assembly using known methods.

Figure 9:
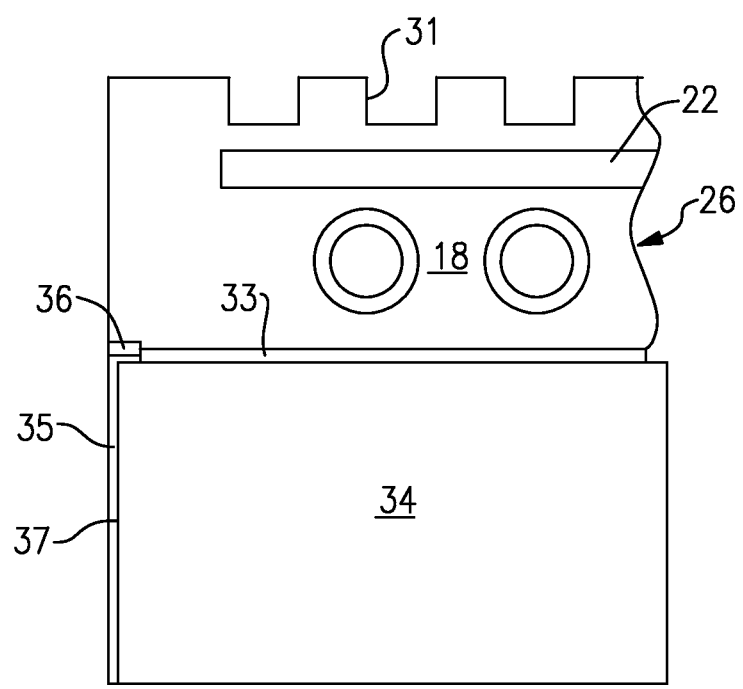
FIG. 9 is a partial front sectional view, with sectioning lines omitted for clarity, of a composite, monolithic coolant plate assembly of FIG. 8 assembled with a pressure plate.

Referring to FIG. 9, a pressure plate 34 is secured to the other side of the coolant plate assembly 26 by a compliant graphitized substrate 33, for example, to produce the end-cell assembly of this disclosure. A PTFE tape 35 is arranged about a perimeter 37 of the pressure plate 34 to prevent corrosion of the pressure plate by the acid. A corrosion resistant sealant 36, such as a Fluorel™ fluoroelastomer manufactured by Dyneon, is provided between the unitary, monolithic coolant plate assembly 26 and the pressure plate 33 near the perimeter 37 and adjoining the tape 35 to prevent leakage of reactants and penetration of acid.

The disclosed end-cell assembly is much less complicated and less expensive than that used in the prior art, which used discrete components that were subsequently taped and assembled. The disclosed end-cell assembly consists of a molded graphite-FEP molded cooler assembly with an integral flow field and integral thermal dam and a pressure plate.

In one example, the combined weight of the preforms on the top and bottom weigh about 60% of the total graphite-FEP weight and the quantity of powder spread over the cooler array represents 40% of the total graphite-FEP weight. For exemplary purposes, a 500 mm×500 mm×17 mm coolant plate assembly may be made by (1) placing a preform containing 80-85% flake graphite-15-20% FEP, formed at 4,000 psi, weighing about 3000 grams into the mold cavity, (2) distributing about 1900 grams of 80-85% flake graphite-15-20% FEP powder over the preform, (3) placing a serpentine cooler array with a tube diameter of 6.4 mm on top of the powder, (4) distributing about 1900 grams of 80-85% flake graphite-15-20% FEP powder around and over the tube array, (5) placing a thermal dam including two 460 mm×460 mm×0.5 mm carbonized substrates sandwiched around a FEP film on top of the powder, (6) placing another preform weighing about 3000 grams on top of the carbonized substrates, (7) placing the mold plunger into the mold, (8) heating to about 550-650° F. (288-343° C.) under a pressure of about 625-900 psi (4311-6300 kPa), (9) cooling to <400° F. (204° C.) under a pressure of 625-900 psi and (10) disassembling the mold and removing the molded coolant plate assembly wherein the cooler, mixture of composite material, flow field and thermal dam comprise a unitary, monolithic structure bound together by the mixture of composite material. In should be understood that the order that the components are placed in the mold may be reversed.

Flow field channels may be machined using known methods. Alternatively, the gas flow field channels 31 may be molded into the preforms 15, 23 as the composite plate is formed in FIG. 7. This would require ribs on the plunger 27. Release materials and other accommodations may be employed in such case.

The embodiment disclosed herein is applicable to liquid electrolyte fuel cells, particularly acid electrolyte fuel cells. Phosphoric acid is currently in common use, but the disclosed embodiment is applicable to other acid electrolytes, such as fluoroborate acid, which systems would operate at pressures and temperatures similar to those of phosphoric acid systems.

Although an example embodiment has been disclosed, a worker of ordinary skill in this art would recognize that certain modifications would come within the scope of the claims. For that reason, the following claims should be studied to determine their true scope and content.

What is claimed is:

1. An end-cooler assembly for a fuel cell comprising:
   a cooler having a coolant tube array;
   a composite material including flake graphite and hydrophobic polymer, the composite material surrounding the coolant tube array and providing a first side;
   a reactant flow field formed in the first side;
   a thermal dam embedded in and entirely surrounded by the composite material, the thermal dam arranged between the coolant tube array and the flow field; and
   wherein the coolant tube array, composite material, flow field and thermal dam comprise a unitary, monolithic structure bound together by the composite material.

2. The end-cooler assembly according to claim 1, comprising a pressure plate secured to a second side of the composite material that is opposite the first side.

3. The end-cooler assembly according to claim 2, wherein a graphitized substrate is arranged between the pressure plate and the second side to provide compliance between the monolithic structure and the pressure plate.

4. The end-cooler assembly according to claim 3, wherein a corrosion resistant tape is arranged about a perimeter of the pressure plate, and a corrosion resistant sealant is provided between the unitary, monolithic structure and the pressure plate near the perimeter and adjoining the tape.

5. The end-cooler assembly according to claim 1, wherein the composite material includes 80-85% by weight flake graphite with the balance provided by one of a FEP, PFA or PTFE polymers.

6. The end-cooler assembly according to claim 1, wherein the bottom of the flow field channel is spaced from the uppermost surface of the thermal dam by approximately 55 mils (1.4 mm).

7. The end-cooler assembly according to claim 1, wherein the thermal dam includes a FEP film arranged between carbonized substrates.

8. The end-cooler assembly according to claim 7, wherein the carbonized substrates are impregnated with a PTFE dispersion.

9. The end-cooler assembly according to claim 7, wherein the carbonized substrates have an electrical areal resistance of about 0.016 ohm-in$^2$ (0.1 ohm-cm$^2$) providing a voltage drop across the thermal dam of about 0.010 V at a current density of 93 A/ft$^2$ (0.1 A/cm$^2$).

10. The end-cooler assembly according to claim 7, wherein the thermal dam has a thermal conductivity of about 0.1 Btu/hr-ft-° F. (0.17 W/m-° K).

11. The end-cooler assembly according to claim 7, wherein the thermal dam is about 40 mils (1.0 mm) thick.

12. A method of manufacturing an end-cooler assembly comprising the steps of:
   a) depositing into a mold a first volume of a mixture of about 80-85% by weight flake graphite with the balance a hydrophobic polymer binder;
   b) loading into the mold a coolant tube array onto the first volume;
   c) depositing into the mold a powder of the mixture onto the coolant tube array;

d) loading into the mold a thermal dam comprising one of a carbonized substrate; or a FEP film sandwiched between two carbonized substrates onto the powder;
e) depositing into the mold a second volume of the mixture onto the thermal dam;
f) compressing the contents of the mold; and heating the contents of the mold above the melting point of the polymer and then cooling to below the solidifying point of the polymer the contents of the mold under compression; and
g) removing from the mold a unitary, monolithic structure comprising the mixture, the coolant tube array and the thermal dam.

13. The method according to claim 12, wherein prior to performing step d), performing the step of manufacturing the thermal dam by laminating a FEP film between carbonized substrates.

14. The method according to claim 12, comprising the step of forming a flow field in the unitary, monolithic structure on a first surface of the mixture near the thermal dam, and securing a pressure plate to a second surface of the mixture opposite the first surface.

* * * * *